United States Patent Office 2,861,051
Patented Nov. 18, 1958

2,861,051

CROSS-LINKED GRAFT COPOLYMERS OF ACRYLONITRILE AND POLYVINYL ALCOHOLS AND METHOD OF PREPARING SAME

John R. Caldwell, Kingsport, Tenn., assignor to Eastman Kodak Company, Rochester, N. Y., a corporation of New Jersey No Drawing. Application May 29, 1956
Serial No. 587,963

10 Claims. (Cl. 260—45.5)

This invention relates to resinous graft type copolymers prepared by polymerizing acrylonitrile, or a mixture thereof with a much lesser amount of a different polymerizable monomer containing but a single olefinic unsaturation, with a cross-linking monomeric agent containing at least two olefinic unsaturations, in the presence of a preformed vinyl alcohol polymer.

It is known that acrylonitrile can be polymerized in the presence of polyvinyl alcohol to give graft copolymers which combine the properties of both polyacrylonitrile and polyvinyl alcohol in modified forms. However, it has been found that films and fibers prepared by such prior art processes have the serious disadvantage that they are unstable in hot or boiling water. In some cases, such products become completely disintegrated in boiling water. Attempts to improve the stability by insolubilization of the polyvinyl alcohol units have been made, for example, by incorporation into the compositions of hardening agents such as salts, acids, formaldehyde, etc., but these methods involve chemical reactions that consume hydroxyl groups and change the fundamental properties of the polymers. Furthermore, the previously known methods introduce elements, into the polymeric compositions that are especially harmful where such modified polymers are used in photographic processes.

I have now found that graft copolymers of acrylonitrile and polyvinyl alcohol and related vinyl alcohol polymers can be modified by a wholly different process so that all of the advantages of these components in combination are retained, without introducing any of the above mentioned serious drawbacks inherent in the prior art processes, by the use of cross-linking agents such as divinylbenzene which are believed to cross-link with the acrylonitrile-polyvinyl alcohol chains through the acrylonitrile units. Thus, my new graft copolymers contain the polyvinyl alcohol in substantially unaltered form in a graft type of combination and thereby retain the valuable properties of this component with respect to dye absorption, flexibility, permeability to aqueous salt solutions, ability to orient and crystalize when drafted, etc. Those of my new graft copolymers which contain 60% or more of the polyvinyl alcohol component show particularly good water vapor permeability. In addition, my new graft copolymers are outstanding in their stability to boiling water, films and fibers thereof showing no signs of disintegration by this treatment. Another important property of the new graft copolymers is that those containing up to about 75% by weight of the acrylonitrile component can be spun to good quality fibers from their aqueous or alcoholic dispersions or emulsions. This is an important and unexpected discovery which makes it possible to spin or cast these species of my new graft copolymers directly from their polymerization reaction mixtures without recourse to the conventional steps of isolation, dissolution in expensive acrylonitrile solvents such as dimethylformamide, etc., followed by spinning or casting shaped articles from these solutions.

It is, acordingly, an object of the invention to provide a new class of insolubilized acrylonitrile-polyvinyl alcohol and related graft copolymers. Another object is to provide superior films and fibers from these copolymers. Another object is to provide a process for preparing the same. Other objects will become apparent hereinafter.

In accordance with the invention, I prepare my new graft copolymers by polymerizing a mixture comprising (1) from 20 to 85%, but preferably from 35 to 70%, by weight of acrylonitrile or a mixture that is predominantly acrylonitrile but containing up to 25% of its weight of another polymerizable comonomer having but a single olefinic unsaturation represented by a $CH_2=C<$ group (vinylidene group), (2) from 80 to 15%, but preferably from 65 to 30%, by weight of a vinyl alcohol polymer such as polyvinyl alcohol or a vinyl alcohol copolymer containing up to 50 mole percent of a different vinylidene compound and (3) from 0.1 to 5%, based on the weight of the acrylonitrile, of a cross-linking agent such as divinylbenzene, etc. The preferred comonomers that can be employed with the acrylonitrile include vinyl esters of saturated aliphatic carboxylic acids containing from 1 to 4 carbon atoms such as vinyl acetate, vinyl propionate, vinyl butyrate, etc., corresponding isopropenyl esters, vinyl benzoate, acrylamide, N-alkyl and N,N-dialkyl acrylamides and corresponding methacrylamides, etc. Suitable vinyl alcohol polymers include polyvinyl alcohol, partially hydrolyzed polyvinyl esters and partially or completely hydrolyzed copolymers of vinyl esters with comonomers such as isopropenyl esters, e. g. isopropenyl acetate, alkyl acrylates and methacrylates e. g. methyl acrylate, methyl methacrylate, etc., acrylamides e. g. acrylamide, methacrylamide, N-methyl acrylamide, N,N-dimethylacrylamide, etc. The hydrolysis products of polyvinyl acetate and vinyl acetate copolymers are preferred. Where the polyvinyl ester is only partially hydrolyzed, the extent of hydrolysis or conversion of vinyl ester units to vinyl alcohol units is set forth as a percentage. In any case, the vinyl alcohol polymer employed contains at least 50 mole percent of vinyl alcohol units in the molecule. Suitable cross-linking agents include divinylbenzene, diallyl phthalate, allyl acrylate, triallyl cyanurate, ethylene glycol diacrylate, and the like.

The polymerizations for preparing the graft copolymers of the invention may be carried out in mass, but preferably in an inert liquid reaction medium such as water, and are accelerated by polymerization catalysts, by actinic light and by heat. Other suitable mediums include alcohols, dioxane, acetone, etc. or mixtures of these solvents with water. Suitable polymerization catalysts include peroxides such as benzoyl peroxide, acetyl peroxide, lauroyl peroxide, di-ter.-butyl peroxide, hydrogen peroxide, sodium or potassium persulfates, sodium or potassium perborates, etc. Azo-bis-isobutyronitrile may also be employed as a catalyst. The amount of catalyst used can vary from about 0.1 to 3.0%, based on the weight of the monomer to be polymerized. The temperature can vary over a wide range, but preferably the polymerizations are carried out at from about 30°–100° C. When carried out in a water medium, an activating agent such as an alkali metal bisulfite e. g. sodium or potassium bisulfite may advantageously be employed. Also, it is advantageous in aqueous systems to employ surface active agents such as fatty alcohol sulfates e. g. sodium or potassium cetyl sulfate, sodium or potassium lauryl sulfate, etc., aromatic sulfonates e. g. sodium or potassium salts of alkylnaphthalene sulfonic acids, sulfonated oils, and the like. These surface active agents may be employed up to about 3–5% of the weight of the components to be graft copolymerized. In general, the graft copolymers contain the components in about the same proportions as they were present in the starting polymerization mixtures. No unreacted monomers are present in the polymerized compositions.

The following examples will serve to illustrate further my new graft copolymers and the manner of their preparations and uses.

*Example 1*

A mixture consisting of 300 g. of polyvinyl alcohol (98–100% hydrolyzed polyvinyl acetate), 100 g. of acrylonitrile, 2.0 g. of divinylbenzene, 1.1 g. of potassium persulfate and 1800 cc. of water was stirred at 55°–60° C. for a period of 8 hours. The final product was an almost transparent emulsion which contained in a graft copolymer combination approximately 74.6% of polyvinyl alcohol, 24.9% of acrylonitrile and 0.5% of divinylbenzene. No unreacted monomers were present in the emulsion. A portion of the above emulsion was coated on a glass plate and the water was evaporated at 110°–120° C. A clear, hard film was produced. The film swelled slightly in boiling water but retained its general shape. The product was useful as a gelatin substitute, for example, in photographic processes where it is desirable to use processing solutions at elevated temperatures in order to obtain faster photographic processing rates. A film having equally good resistance to hot water was obtained by evaporating the emulsion at 40°–50° C.

For purpose of comparison with the above, a similar component product was made by a stepwise process. Thus, a mixture of 100 g. of acrylonitrile, 2.0 g. of divinylbenzene, 1.1 g. of potassium persulfate, 1.0 g. of sodium dodecyl sulfate and 800 cc. of water was stirred at 50°–60° C. for 6 hours to give an emulsion of cross-linked polyacrylonitrile. The emulsion was mixed with a solution of 300 g. of poylvinyl alcohol in 1000 cc. of water and films were coated from this mixture. After drying at 110°–120° C., the films were opaque and very weak. They disintegrated completely after soaking in water at room temperature for several minutes. It will be noted that this composition is the same as the one described above except that it is made by a stepwise process in which the acrylonitrile and divinylbenzene were polymerized together in the absence of the polyvinyl alcohol. Under these conditions, the intimate graft copolymer association complex of cross-linked polyacrylonitrile and polyvinyl alcohol of the invention would not be formed. The great difference in physical properties of the respective films shows that all three components must be present simultaneously in the polymerization reaction mixture.

In place of the divinylbenzene in the above example for making the new graft copolymers of the invention, there can be substituted a like amount of others of the mentioned cross-linking agents such as allyl acrylate, ethylene glycol diacrylate, and the like, to give generally similar products that are also stable to hot water and useful as gelatin substitutes in photographic processes.

*Example 2*

A mixture consisting of 100 g. of polyvinyl alcohol (95–98% hydrolyzed polyvinyl acetate), 100 g. of acrylonitrile, 20 g. of isopropenyl acetate, 2.6 g. of triallyl cyanurate, 2.0 g. of sodium dodecyl sulfate, 1.4 g. of potassium persulfate and 800 cc. of water was stirred at 60° C. for 8 hours to produce an emulsion containing in a graft copolymer combination the above polymerizable components in approximately the starting proportions. No unreacted monomers were present in the emulsion. The emulsion was extruded into an aqueous alcohol spinning bath. The fibers obtained were drafted 500% at an elevated temperature and then heated at 190°–200° C. for 3 minutes while held under tension. A dry strength of 2.6 g./denier and a wet strength of 1.7 g./denier was shown by these fibers. They also showed excellent resistance to hot water and dyed well with direct cotton and vat dyes.

In contrast to the above results, when the triallyl cyanurate was omitted from the recipe of the above example, the resultant fibers had a wet strength of only 0.6 g./denier and disintegrated in boiling water.

In place of the triallyl cyanurate, there can be substituted a like amount of others of the mentioned cross-linking agents such as allyl acrylate, divinylbenzene, and the like, to give generally similar fibers having good affinity for various textile dyes and high resistance to hot or boiling water.

*Example 3*

A mixture of 200 g. of polyvinyl alcohol (70% hydrolyzed polyvinyl acetate), 90 g. of acrylonitrile, 20 g. of acrylamide, 2.0 g. of benzoyl peroxide, 3.0 g. of diallyl phthalate, 650 cc. of isopropyl alcohol and 150 cc. of water was stirred at 60° C. for 8 hours. The resulting suspension of graft copolymer of the above active components was extruded through a spinneret into a heated chamber and the fiber was collected on a bobbin. The fiber was drafted 400% in hot air, then heated for 2 minutes at 200° C. A strong, elastic fiber was obtained. It had a good wet strength, was stable to boiling water and dyed well with direct cotton dyes, acid wool dyes, cellulose acetate dyes and vat dyes.

In contrast to the above results, when the diallyl phthalate was omitted from the recipe of the above example, the resultant fibers had a relatively low wet strength and disintegrated when treated with boiling water.

*Example 4*

The formula and process of Example 2 was repeated, except that the polyvinyl alcohol was substituted with a like amount of a hydrolyzed copolymer of 70% vinyl acetate and 30% isopropenyl acetate. This hydrolyzed copolymer contained vinyl alcohol units and isopropenyl acetate units in the proportions by weight of about 70% and 30%, respectively. The graft copolymer product obtained had generally similar properties as that produced in Example 2.

The process of the above example was repeated, except that the cross-linking agent, triallyl cyanurate, was omitted from the recipe. Fibers prepared from this process had affinity for textile dyes, but showed poor wet strength and disintegrated in boiling water.

Other generally similar graft copolymers coming within the sope of the invention may be prepared by following the procedures of the above examples with any of the mentioned polymerizable components in the specified proportions and combinations. These products also show good dye absorptions and high resistance to hot or boiling water, and films and coatings thereof directly from their polymerization reaction mixtures, i. e. dispersions thereof, are clear and flexible, while the fibers thereof have the added ability to orient and crystallize when drafted. Some of these products are also permeable to aqueous salt solutions and, accordingly, are especially useful as gelatin substitutes in photographic processes. Thus, they can function as vehicles for silver halide salts and as materials for filter layers, antihalation layers, dye layers, separation layers, etc. in photographic elements. While the examples have illustrated the process of the invention with only the very essential materials, it will be understood that limited amounts of inert materials such as dyes, pigments, plasticizers, etc. can be added to the polymerization reaction mixtures at any stage of polymerization and that these will give added effects and utility to the films, coatings and fibers produced directly from the polymerized reaction mixtures.

It should be noted that the examples shown of the resinous graft copolymers of the invention prepared in accordance with Examples 1 to 4, have an overall range of proportions of from 24.9 to 53.9% by weight of the said monomeric acrylonitrile member, from 44.9 to 74.6% by weight of the said preformed polymer member and from 0.5 to 1.2% by weight of the said cross-linking member.

What I claim is:

1. A resinous graft copolymer of (1) from 24.9 to 53.9% by weight of polymerizable monomeric material selected from the group consisting of (a) acrylonitrile and (b) a mixture consisting of at least 80% by weight of acrylonitrile and the remainder of a monomer selected from the group consisting of isopropenyl acetate and acrylamide, (2) from 74.6 to 44.9% by weight of a preformed polymer selected from the group consisting of, a hydrolyzed polyvinyl acetate wherein from 70 to 100% of the vinyl acetate units have been converted to vinyl alcohol units, and a copolymer consisting of 70% by weight of vinyl alcohol units and the remainder of isopropenyl acetate units, and (3) from 0.5 to 1.2% by weight of a cross-linking agent selected from the group consisting of divinylbenzene, diallyl phthalate, triallyl cyanurate, allyl acrylate and ethylene glycol diacrylate, and wherein the said polymerizable monomeric material and the said cross-linking agent have been combined by addition polymerization with the said preformed polymer to give the said graft copolymer.

2. A resinous graft copolymer of (1) from 24.9 to 53.9% by weight of acrylonitrile, (2) from 74.6 to 44.9% by weight of preformed polyvinyl alcohol, and (3) from 0.5 to 1.2% by weight of divinylbenzene, wherein the said acrylonitrile and the said divinylbenzene have been combined by addition polymerization with the said preformed polyvinyl alcohol to give the said graft copolymer.

3. A resinous graft copolymer of (1) from 24.9 to 53.9% by weight of a mixture consisting of at least 80% by weight of acrylonitrile and the remainder of isopropenyl acetate, (2) from 74.6 to 44.9% by weight of a preformed partially hydrolyzed polyvinyl acetate wherein from 95 to 98% of the vinyl acetate units have been converted to vinyl alcohol units, and (3) from 0.5 to 1.2% by weight of triallyl cyanurate, and wherein the said mixture of acrylonitrile and isopropenyl acetate and the said triallyl cyanurate have been combined by addition polymerization with the said preformed partially hydrolyzed polyvinyl acetate to give the said graft copolymer.

4. A resinous graft copolymer of (1) from 24.9 to 53.9% by weight of a mixture consisting of at least 80% by weight of acrylonitrile and the remainder of acrylamide, (2) from 74.6 to 44.9% by weight of a preformed partially hydrolyzed acetate wherein 70% of the vinyl acetate units have been converted to vinyl alcohol units, and (3) from 0.5 to 1.2% by weight of diallyl phthalate, and wherein the said mixture of acrylonitrile and acrylamide and said diallyl phthalate have been combined by addition polymerization with the said preformed partially hydrolyzed polyvinyl acetate to give the said graft copolymer.

5. A resinous graft copolymer of (1) from 24.9 to 53.9% by weight of a mixture consisting of at least 80% by weight of acrylonitrile and the remainder of isopropenyl acetate, (2) from 74.6 to 44.9% by weight of a copolymer consisting of 70% by weight of vinyl alcohol units and 30% by weight of isopropenyl acetate units, and (3) from 0.5 to 1.2% by weight of triallyl cyanurate, wherein the said mixture of acrylonitrile and isopropenyl acetate and the said triallyl cyanurate have been combined by addition polymerization with the said preformed copolymer to give the said graft copolymer.

6. A process for preparing a resinous graft copolymer which comprises heating a mixture comprising a liquid reaction medium selected from the group consisting of water and a mixture of water and isopropyl alcohol, a peroxide polymerization catalyst, and as the sole polymerizable components (1) from 24.9 to 53.9% by weight of polymerizable monomeric material selected from the group consisting of (a) acrylonitrile and (b) a mixture consisting of at least 80% by weight of acrylonitrile and the remainder of a monomer selected from the group consisting of isopropenyl acetate and acrylamide, (2) from 74.6 to 44.9% by weight of a preformed polymer selected from the group consisting of, a hydrolyzed polyvinyl acetate wherein from 70 to 100% of the vinyl acetate units have been converted to vinyl alcohol units, and a copolymer consisting of 70% by weight of vinyl alcohol units and 30% by weight of isopropenyl acetate units, and (3) from 0.5 to 1.2% by weight of a cross-linking agent selected from the group consisting of divinylbenzene, diallyl phthalate, triallyl cyanurate, allyl acrylate and ethylene glycol diacrylate, whereby the said polymerizable monomeric material and the said cross-linking agent have been combined by addition polymerization with the said preformed polymer to give the said graft copolymer.

7. The process for preparing a resinous graft copolymer according to the process of claim 6 wherein (1) is acrylonitrile, (2) is polyvinyl alcohol, and (3) is divinylbenzene.

8. The process for preparing a resinous graft copolymer according to the process of claim 6 wherein (1) is a mixture consisting of at least 80% by weight of acrylonitrile and the remainder of isopropenyl acetate, (2) is a partially hydrolyzed polyvinyl acetate wherein from 95 to 98% of the vinyl acetate units have been converted to vinyl alcohol units, and (3) is triallyl cyanurate.

9. The process for preparing a resinous graft copolymer according to the process of claim 6 wherein (1) is a mixture consisting of at least 80% by weight of acrylonitrile and the remainder of acrylamide, (2) is a partially hydrolyzed polyvinyl acetate wherein 70% of the vinyl acetate units have been converted to vinyl alcohol units, and (3) is diallyl phthalate.

10. The process for preparing a resinous graft copolymer according to claim 6 wherein (1) is a mixture consisting of at least 80% by weight of acrylonitrile and the remainder of isopropenyl acetate, (2) is a copolymer consisting of 70% by weight of vinyl alcohol units and 30% by weight of isopropenyl acetate units, and (3) is triallyl cyanurate.

References Cited in the file of this patent

UNITED STATES PATENTS

| 2,310,961 | Kropa | Feb. 16, 1943 |
| 2,332,900 | D'Alelio | Oct. 26, 1943 |
| 2,596,945 | Shokal et al. | May 13, 1952 |

FOREIGN PATENTS

| 1,054,343 | France | Oct. 7, 1953 |